March 14, 1944.   J. M. HOTHERSALL ET AL   2,343,906
COATING MACHINE
Filed March 17, 1939   11 Sheets-Sheet 1

Fig 1

INVENTORS
John M. Hothersall
John H. Meuch
BY Ivan D. Thornburgh
Charles H. Crise
ATTORNEYS March 14, 1944.   J. M. HOTHERSALL ET AL   2,343,906
COATING MACHINE
Filed March 17, 1939    11 Sheets-Sheet 3

Fig 3

INVENTORS
John M. Hothersall
John H. Murch
BY Evan D. Thornburgh
Charles H. Cripe
ATTORNEYS March 14, 1944. J. M. HOTHERSALL ET AL 2,343,906
COATING MACHINE
Filed March 17, 1939 11 Sheets-Sheet 10

Patented Mar. 14, 1944

2,343,906

UNITED STATES PATENT OFFICE 2,343,906

COATING MACHINE

John M. Hothersall, Brooklyn, N. Y., and John H. Murch, East Orange, N. J., assignors to American Can Company, New York, N. Y., a corporation of New Jersey Application March 17, 1939, Serial No. 262,560

11 Claims. (Cl. 226—20)

The present invention relates to coating machines and the like and has particular reference to applying a coating such as paraffin wax to the interior and exterior surfaces of fibre containers and immediately thereafter chilling the paraffin coating in an atmosphere of filtered and substantially sterile air.

An object of the invention is the provision of a container coating machine wherein the containers are immersed in a bath of melted paraffin wax or the like so that the interior as well as the exterior surfaces of the containers will be entirely coated, the containers immediately after coating being chilled to set the paraffin before they are discharged from the machine, these operations being effected in separate chambers having separate conveyors for carrying the containers therethrough to the end that the conveyors and the chambers in which they operate may be maintained at constant and uniform temperatures.

Another object is the provision of such a coating machine wherein the coated containers are rotated into an inverted position for a predetermined period of their cycle so that excess paraffin may be entirely drained from both the inside and outside of the containers, the containers after draining being further rotated into an upright position for subsequent chilling and discharge from the machine.

Another object is the provision in a machine of this character wherein chilling of the container coating is effected in a filtered and substantially sterile atmosphere, the interior of the containers being charged with filtered and substantially sterile air and then sealed before the paraffin coating has entirely set so that complete hardening of the coating will hermetically seal the container thereby preserving an uncontaminated interior for the time it is desired to fill the container with its product.

Another object is the provision of such a machine in which containers having attached closure elements are adapted to be coated and in which the closure elements are maintained in an open position until fully coated and chilled so that both the interior surfaces as well as the exterior surfaces may be effectively treated.

Numerous other objects and advantages of the invention will be apparent as it is better understood from the following description, which, taken in connection with the accompanying drawings, discloses a preferred embodiment thereof.

Referring to the drawings:

Figs. 3 to 8, inclusive, are enlarged vertical sectional views taken substantially along the respective lines 3—3, 4—4, 5—5, 6—6, 7—7 and 8—8 in Fig. 1, Figs. 3, 5 and 7 being longitudinal sections while Figs. 4, 6 and 8 are transverse sections;

Fig. 12 is an enlarged longitudinal section taken substantially along the line 12—12 in Fig. 1;

Figs. 13, 14, 15, 16, 17 and 18 are transverse sectional details showing a portion of one of the conveyors in the machine and illustrating different positions of containers being carried by the conveyor, Figs. 13, 14 and 15 being taken substantially along the respective lines 13—13, 14—14, 15—15 in Fig. 12 while Figs. 16 and 18 are taken substantially along the respective lines 16—16, 18—18 in Fig. 20, Fig. 17 being taken at a point substantially midway between the lines 16—16, 18—18 in Fig. 20;

As a preferred embodiment of the present invention the drawings illustrate a coating machine adapted to apply a coating of paraffin wax or the like to a milk container of the character disclosed in the John M. Hothersall United States Patent 2,085,979, issued July 6, 1937, on Container, although the invention is equally well adapted to other types of containers. A container of the Hothersall type, indicated in the drawings by the letter a, is provided with a closure element b (Figs. 12, 13, 20) which is hingedly attached to the container top by a staple and which is adapted to fit into and close a filling and dispensing opening c when the container is sealed for shipment and storage.

Figure 1:
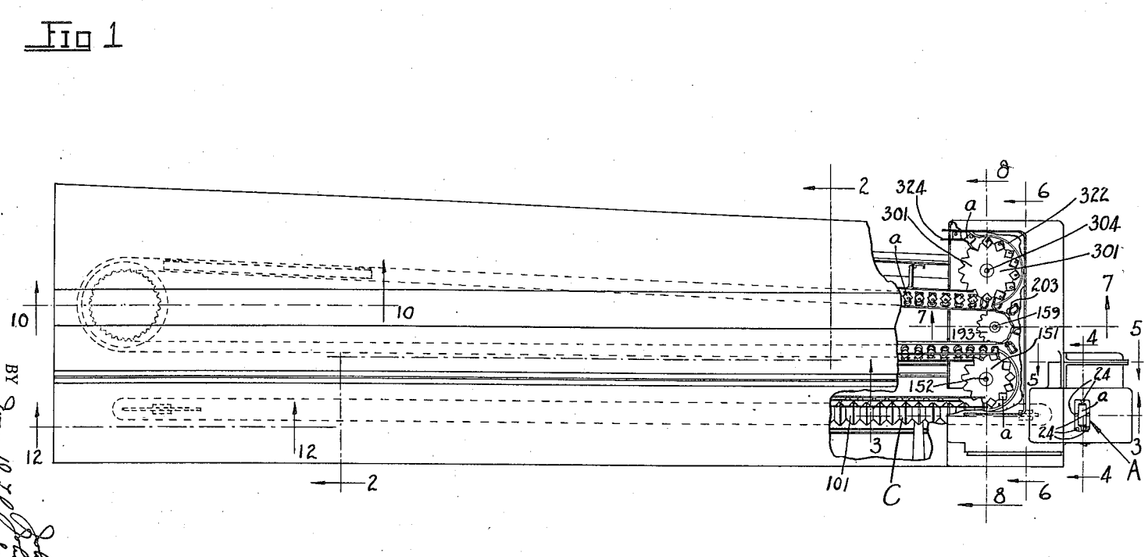
Figure 1 is a top plan view of a coating machine embodying the instant invention, parts being broken away.
Figure 3:
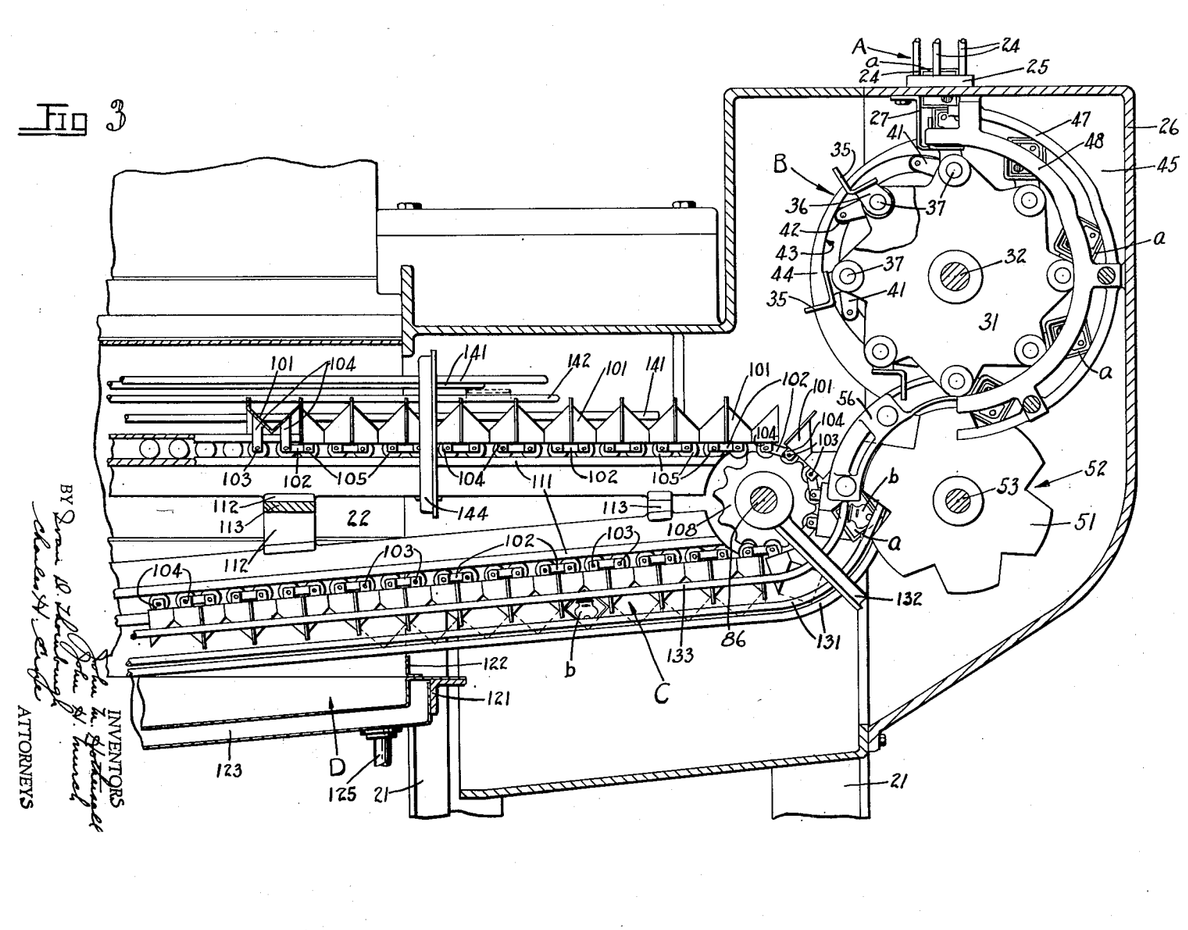

The containers a enter the machine in a horizontal position and in a continuous processional order and are fed from a stack A (Figs. 1 and 3) by a feeding device B which properly positions them for reception by a continuously moving coating conveyor C. The coating conveyor carries the containers, with their closure elements open, down into a bath of a suitable coating liquid, preferably molten paraffin wax which is contained in a tank reservoir D. After immersion in the paraffin bath the conveyor carries the containers back over the top of the reservoir while turning them into an inverted position to permit complete draining of excess paraffin from both the interior and the exterior surfaces of the containers. When fully drained the containers are rotated into an upright position.

Adjacent the entrance end of the machine the coated containers are transferred from the coating conveyor C to a chilling conveyor E (see also Fig. 1), which is housed in a chamber F through which filtered and substantially sterile air at a chilling temperature is continuously circulated. While traveling through this chamber and before the paraffin wax is fully set or hard, the containers are filled with a charge of filtered and substantially sterile air. This filling is effected by a charging device G (Figs. 10 and 11).

Figure 10:
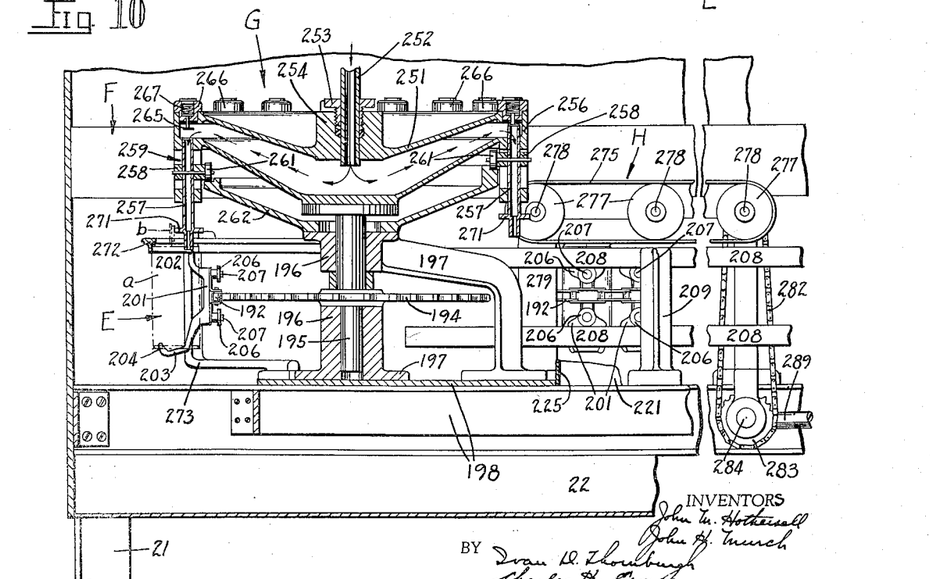
Fig. 10 is an enlarged longitudinal section taken substantially along the line 10—10 in Fig. 1.

Immediately after charging with air each container is closed by a closing device H (Figs. 10 and 11) which inserts the hinged closure element b into the container dispensing opening c. Continued chilling of the containers completely sets the paraffin coating and thereby seals the inserted closure elements in place thus trapping the charge of filtered air inside each container. This completes the coating and closing operations and the containers are thereafter discharged from the machine.

Containers are coated to render the moistureproof and are sealed in this manner so that their interior coated surfaces will be maintained free from contamination permitting delivery to the dairy or other packer in this condition. When it is desired to fill the containers with milk or other products the seal is broken just prior to the filling operation and the closure element lifted to expose the filling and dispensing opening only long enough to receive the milk. After the container is filled the closure element is immediately replaced and the container resealed. This filling and reclosing operation forms no part of the instant invention and is here mentioned to give a clearer conception of the importance of the part the instant machine plays in preparing a substantially sterile container suitable for use in shipping and storing perishable food products, etc.

The various moving parts of the machine are entirely enclosed by plates of cast and sheet metal which in themselves constitute a part of the framework of the machine. These plates are in turn secured to a structural steel frame which comprises in part numerous leg sections 21 (Fig. 2) which support longitudinally disposed main beams 22.

The container magazine A (Figs. 1 and 3) is located at the can entrance end of the machine. This magazine comprises a plurality of upright guide bars 24 the lower ends of which are secured in a base plate 25. The bars are arranged to receive the containers in a horizontal position from a suitable source of supply and to retain them in a vertical stack. The longitudinal axial dimension of the containers in the stack extends transversely of the machine. The base plate 25 is bolted to a housing cover 26 which is secured to the foremost legs 21 of the machine frame.

Openings in the base plate 25 and in the cover 26 permit the containers to pass down into the machine proper. A shelf member 27 is located inside the housing cover in line with the container entrance openings and supports the entire stack of containers, being formed to retain the lowermost container of the stack below and inside of the machine cover. The shelf member is bolted to the cover 26. The closure elements b on the containers in the stack are in open position and extend outwardly at an angle to the tops of the containers.

Figure 4:
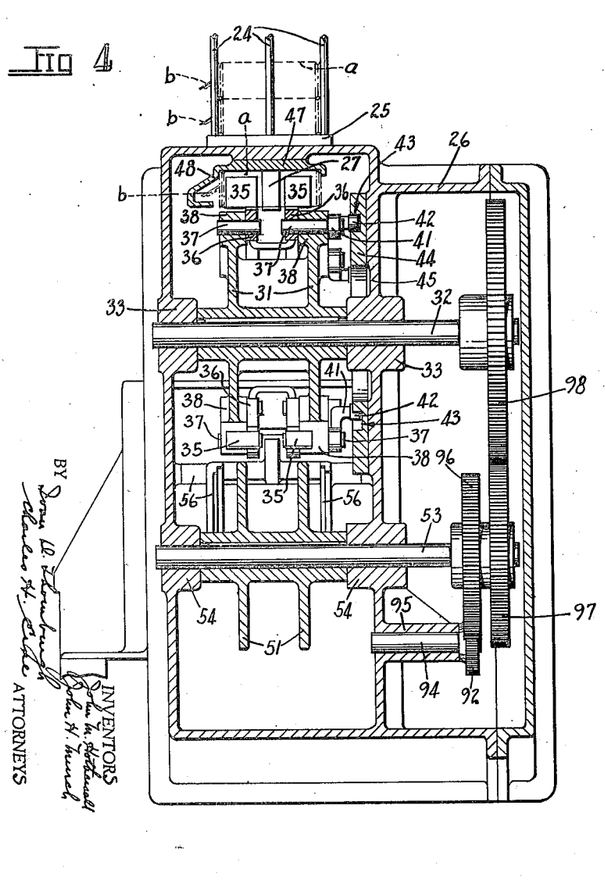

The container feeding device B is located directly under the magazine A and includes a double disc feed turret 31 (Figs. 3 and 4) mounted on a rotatable turret shaft 32 carried in bearings 33 formed in the housing cover 26. The turret carries a plurality of pairs of spaced and movable right angle container saddles or carriers 35 which are formed on pairs of connected arms 36 mounted on pins 37 disposed in bearings 38 provided in the turret 31. These pairs of saddles are adapted to straddle and pass by the magazine shelf member 27 when the turret rotates.

One of the carrier arm pins 37 of each set of saddles 35 is keyed to a cam lever 41 having a cam roller 42 which is carried around through a cam groove 43 of a stationary cam 44 secured to a web 45 of the housing cover 26. The cam parts guide and position the moving saddles 35 as will now be explained.

As the feed turret 31 rotates it carries the saddles 35 along a circular path of travel. At the top of the turret each saddle moves past the magazine shelf member 27 and sweeps off the container supported directly on the shelf. This is the lowermost container in the magazine and as soon as it is picked off the entire stack moves down the distance of one container thereby presenting the next container exposed on the shelf ready for the next saddle as it comes into position adjacent the shelf.

The removed or picked-off container is carried down toward the bottom of the turret. During this travel the container is also rotated on its longitudinal axis into an angular position so that by the time it reaches the turret bottom it will expose a corner edge instead of a flat surface. This rotating of the container is performed by the cam groove 43 shifting the cam lever 41 and the saddle parts connected therewith through the medium of the cam roller 42 which continually travels along its cam groove.

During this bodily change of position and during its turning, the container is held in its saddle by a combined outer and end curved guide rail 47 which is secured to the housing cover 26. A laterally projecting side extension 48 of this rail also holds open the closure element b of the container as it moves along.

At the bottom of the feed turret 31 the angularly disposed containers a are transferred into a rotatable auxiliary feed turret 51 (Figs. 3 and 4) which is also of the double disc construction. This auxiliary turret is provided with spaced angular pockets 52 into which the transferred containers move. Turret 51 is mounted on a cross shaft 53 journaled in bearings 54 formed in the housing cover 26. Side guide rails 55 hold the transferred containers in their respective pockets as the turret rotates and also maintain each closure element b in open position. It is this auxiliary feed turret that positions the containers into the conveyor C hereinbefore mentioned.

Figure 6:
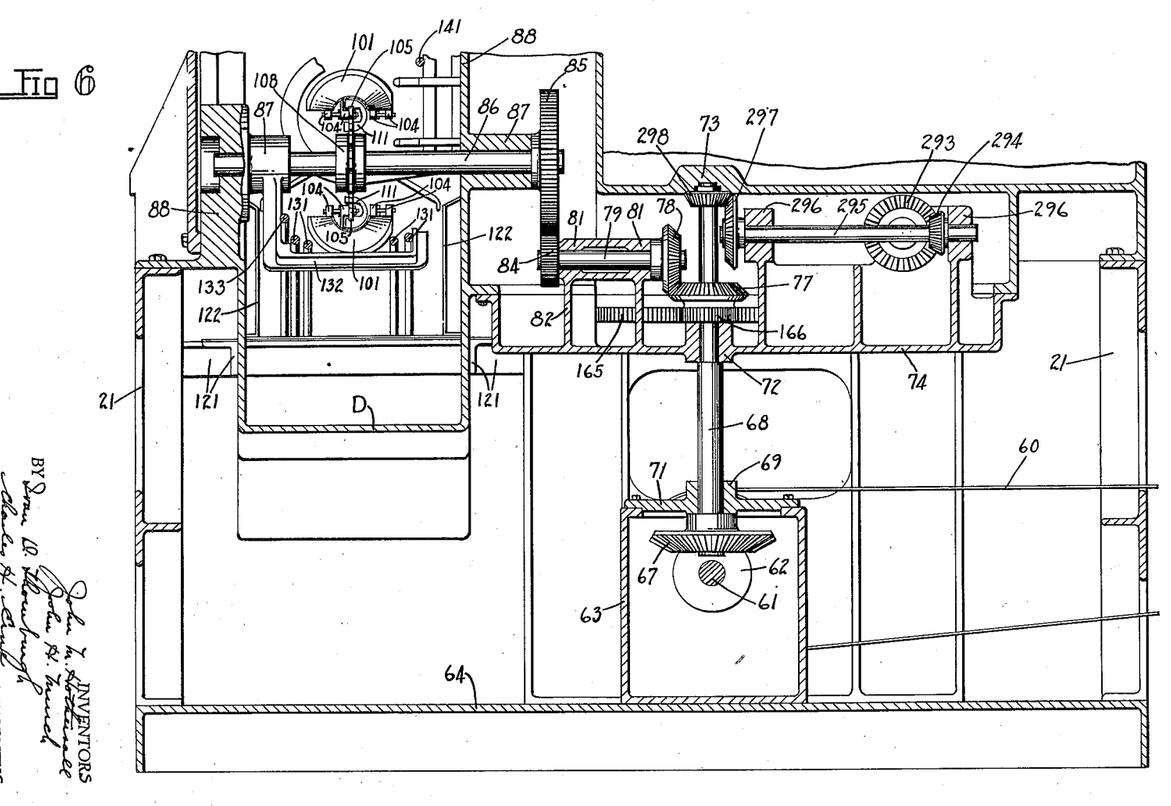
Figure 7:
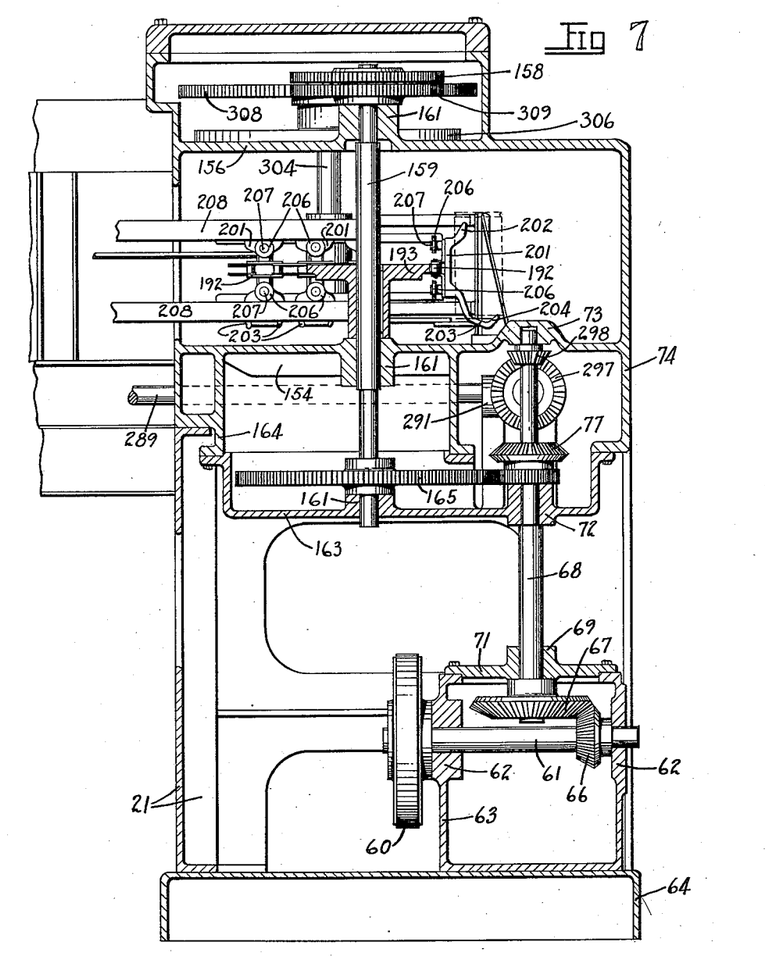

Rotation of the feed turret 31 and its auxiliary turret 51 is preferably effected by the application of power from any suitable source such as for example, a belt and pulley 60 (Figs. 6 and 7), to a drive shaft 61 which is the main shaft of the entire machine. This shaft is journaled in bearings 62 formed in a gear case 63 supported on a machine base plate 64. The main shaft carries a driving bevel pinion 66 which meshes with and drives a bevel gear 67 mounted on a vertical shaft 68 journaled in a bearing 69 formed in a cover plate 71 for the gear case 63 and also in spaced bearings 72, 73 provided in an upper gear housing 74 supported by legs 21 of the machine.

Figure 5:
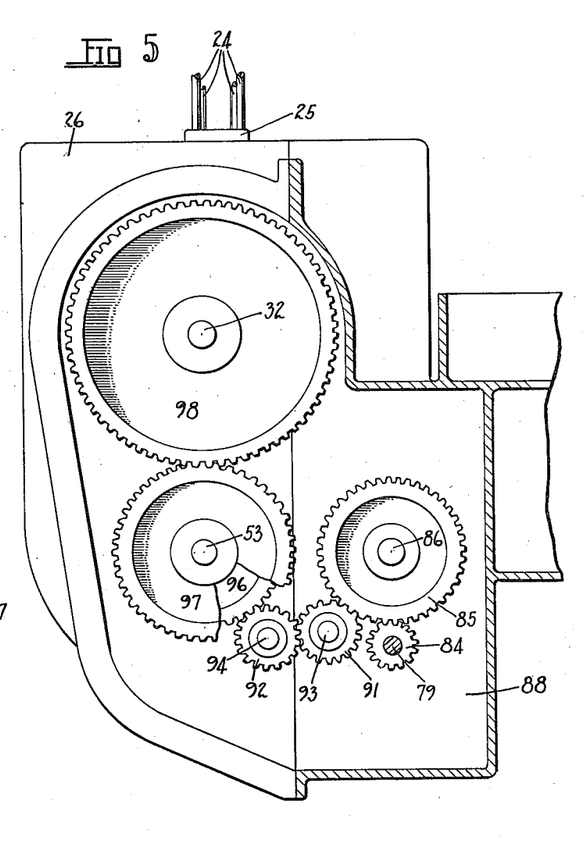

Adjacent the bearing 72 the vertical shaft 68 is provided with a bevel gear 77 which drives a corresponding gear 78 mounted on the inner end of a horizontal shaft 79 (see also Fig. 5) journaled in bearings 81 of a bracket 82 formed integrally with the gear housing 74. The inner end of this horizontal shaft carries a spur gear 84 which drives a conveyor gear 85 mounted on a conveyor sprocket shaft 86 journaled in bearings 87 formed in walls of a conveyor housing 88 supported on legs 21 of the machine.

Conveyor gear 85 drives a pair of meshing idler gears 91, 92 mounted on respective short shafts 93, 94. Shaft 93 is carried in a suitable bearing formed in the conveyor housing 88 while shaft 94 is journaled in a bearing 95 (Fig. 4) formed in the housing cover 26. Idler gear 92 drives a gear 96 which is mounted on the auxiliary feed turret shaft 53. It is this gear 96 that drives the auxiliary feed turret. A second gear 97 is formed integrally with gear 96 and this second gear drives a large gear 98 mounted on the main feed turret shaft 32. It is this large gear that rotates the main feed turret. Hence the two turrets are rotated in unison and in synchronism to properly feed the containers.

The coating conveyor C which receives the containers to be coated from the auxiliary feed turret 51 extends nearly the full length of the machine. This conveyor comprises a plurality of V-shaped buckets 101 (Figs. 2, 3, 6, 9, 12 and 13) which are semi-circular in cross section and which are connected together by pairs of links 102 to form an endless chain. The ends of the connecting links 102 are secured by pins 103 to pairs of lugs 104 formed on the bottom of each bucket. The inner end of one of the pins 103 of each transverse set of lugs 104 carries a roller 105.

The coating conveyor as a unit takes over and is driven by spaced sprockets 108, 109, the rollers 105 engaging in the depressions between the sprocket teeth. Between the sprockets the rollers ride in grooved tracks 111, which guide and retain the conveyor buckets in upright position. These tracks are secured to vertical brackets 112 (see Figs. 2, 3 and 12) formed on cross beams 113 the ends of which are supported on the main beams 22 of the main frame.

Figure 19:
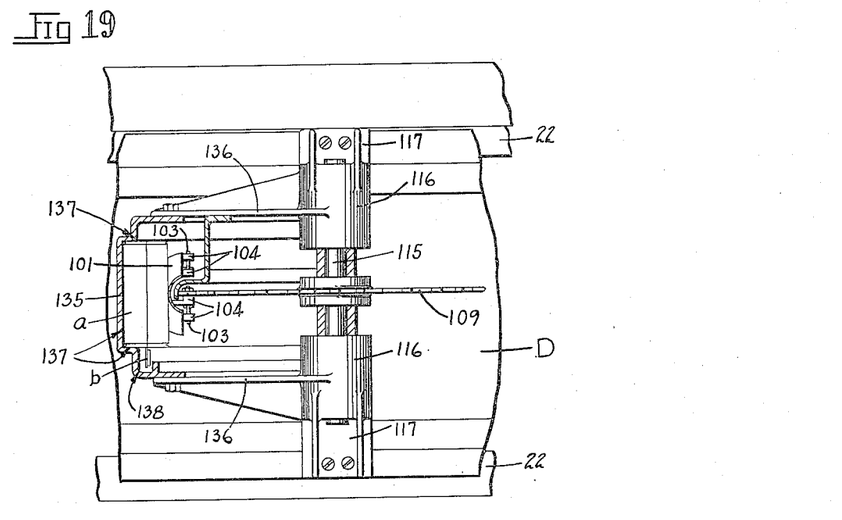
Fig. 19 is a horizontal section taken substantially along the line 19—19 in Fig. 12.

Sprocket 108 is the driving sprocket and is mounted on the sprocket shaft 86 adjacent the auxiliary feed turret 51. Sprocket 109 is located at the opposite end of the machine and is mounted on an idler shaft 115 (see also Fig. 19) carried in bearings 116 formed in brackets 117 bolted to the main beams 22 of the main frame. This sprocket is considerably larger in diameter than sprocket 108 and is mounted so that the upper run of the conveyor will be substantially horizontal. The lower run is therefore inclined to the horizontal.

The lower inclined run of the conveyor extends from sprocket 108 down into the paraffin tank D. This tank extends nearly the full length of the conveyor and is preferably made of sheet metal supported on angle irons 121 secured to the legs 21 of the frame. Above the tank a sheet metal drip or splash pan 122 is provided and forms an upward flaring extension of the tank side walls. Liquid or molten paraffin is introduced into the tank in any suitable manner.

Around the bottom and side walls of the tank there is provided a steam jacket 123 the outer wall of which is in spaced relation with the tank wall. The paraffin in the tank is maintained in a molten condition at a predetermined temperature by steam which is circulated through the space between the tank and the jacket wall. Steam inlet and outlet pipes 125, 126 are provided in the jacket for this purpose. A cover 128 extends over the upper run of the conveyor and completely encloses the conveyor and the tank thus setting off a chamber through which the conveyor operates. This chamber is heated by the paraffin in the tank.

The conveyor C moves in time with the auxiliary feed turret 51 and in such a manner that the conveyor buckets 101 align with the turret pockets 52 as the buckets travel around the driving sprocket 108. Hence a container a in a pocket 52 of the feed turret 51 meets a bucket 101 of the conveyor. As the turret and the conveyor continue to operate the container is swept out of the turret pocket 52 and thereupon is retained in position in the conveyor bucket 101.

This transfer of the container is effected by spaced and parallel guide bars 131 (Figs. 2, 3 and 12) the forward ends of which extend up adjacent the turret. These guide bars are arranged to engage the container adjacent each of its ends and also against the outer exposed corner edge. The bars are supported in frames 132 which surround the conveyor and the roller track 111. Another guide bar 133 extends adjacent the other bars and maintains the closure elements of the containers in open position.

The guide bars 131, 133 extend parallel and are coextensive with the lower run of the conveyor C and hence guide the container with its open closure element while it is passed down into the paraffin in the tank D. The entire container is submerged in the paraffin so that the latter will enter the container through the open dispensing hole c.

Adjacent the large sprocket 109 the guide bars 131, 133 terminate and abut against a curved guide plate 135 (Figs. 12 and 19) which continues to guide the container as it travels upward out of the paraffin bath and around the sprocket to the upper run of the conveyor. This guide plate is supported on radial arms 136 formed on the sprocket shaft bearings 116 and is provided with container end and corner guiding surfaces 137 and a closure element guiding surface 138. The effect of this travel of the container along this curved guide plate is that it is lifted out of the paraffin bath and simultaneously is bodily carried out its longitudinal axis through one hundred and eighty degrees. The container is partially filled with the paraffin which it has received from the tank and this turning action spreads the paraffin within the container, over any inside surfaces not previously covered. It also spreads the molten wax on the container exterior. Thus the whole inside and outside as well as the closure element is completely covered with the paraffin.

Along the upper run of the conveyor spaced and parallel guide bars 141 (Figs. 2, 3, 12, 13 and 20) are provided to further guide the coated container along the next leg of its path of travel. A separate guide bar 142, which is parallel with the others, continues to hold the closure element b in open position. The adjacent ends of these bars abut against the curved guide plate 135. These bars are supported in frames 144 which surround the upper run of the conveyor and which are secured to the upper roller track 111.

Figures 12, 13, 14, 15:
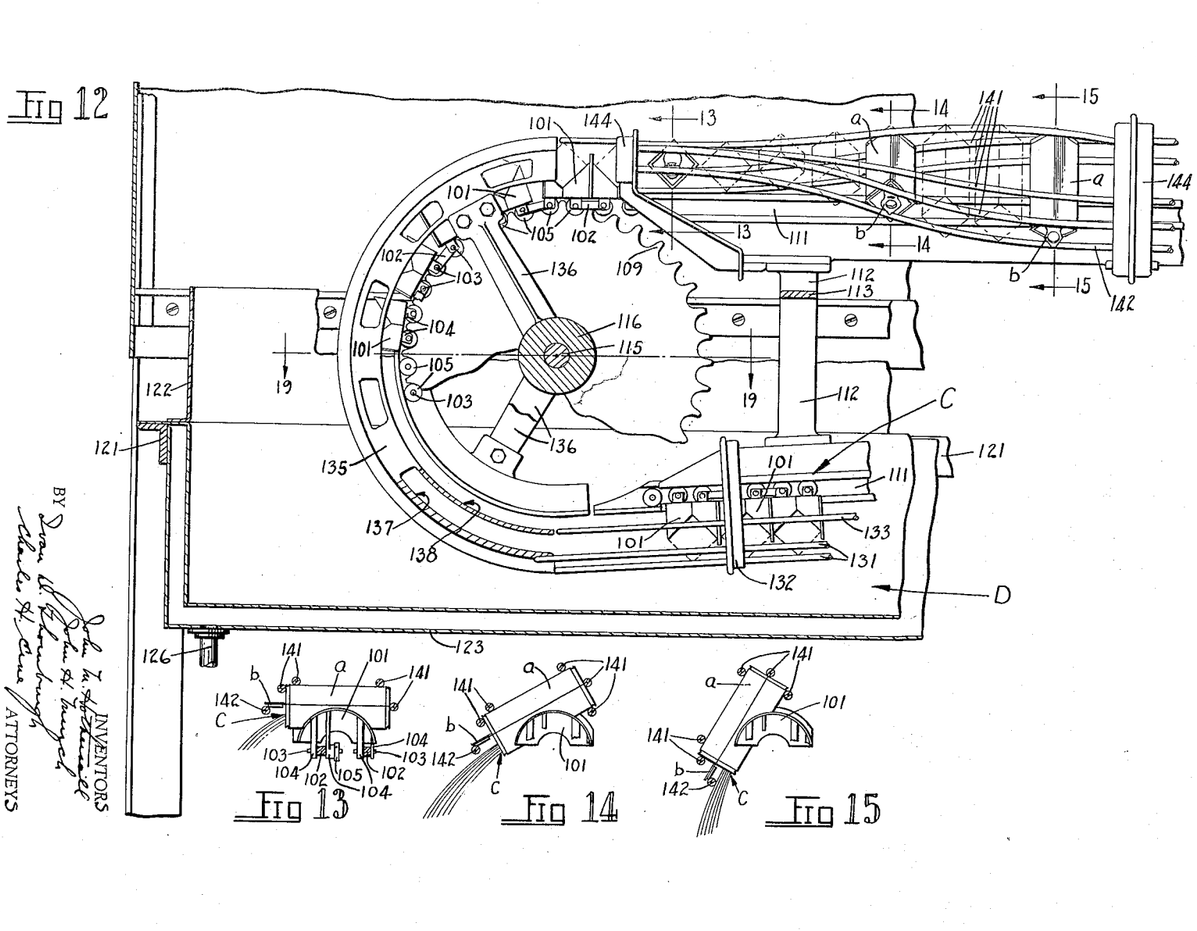

The entrance end of the guide rails are twisted into a quarter turn runway section, as best shown in Fig. 12, and the paraffin filled containers in passing through the section move from a horizontal position into an inverted position. This turning action is graphically illustrated in Figs. 13, 14, 15. It is for this purpose that the conveyor buckets have a semi-circular cross section, such a contour permitting full and easy swinging of the containers while they are still retained in the buckets. The paraffin within the containers is thus emptied back into the paraffin tank D for re-use, a thin film remaining as a coating on the containers. The moving containers are maintained in this inverted position while they travel back along the upper run of the conveyor and thus there is time for excess paraffin to drain off.

Figure 16:
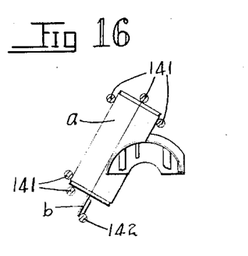
Figure 17:
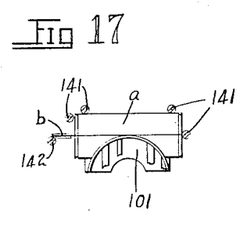
Figure 18:
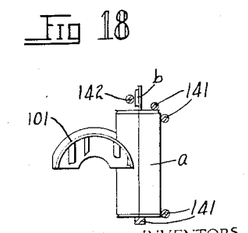
Figure 20:
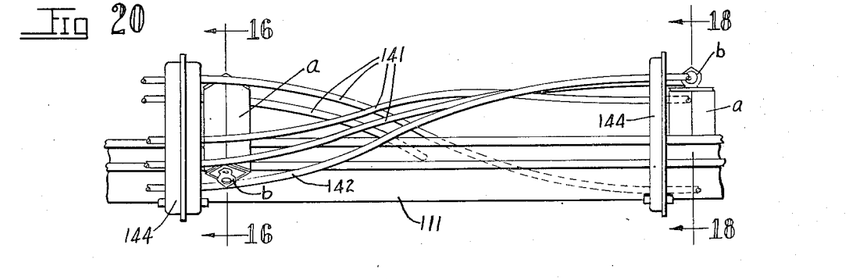
Fig. 20 is an enlarged side elevation of a portion of a container guideway, the part illustrated being a continuation of the same guideway which is shown at the upper right of Fig. 12.

Following the draining period the containers are turned or rotated back first through a horizontal position and then into an upright position so that they will rest on their bottom ends. A half turn runway section is used for this purpose, the guide bars 141, 142 being properly twisted as best illustrated in Fig. 20. A graphic illustration of this turning action is shown in Figs. 16, 17 and 18.

Figure 8:
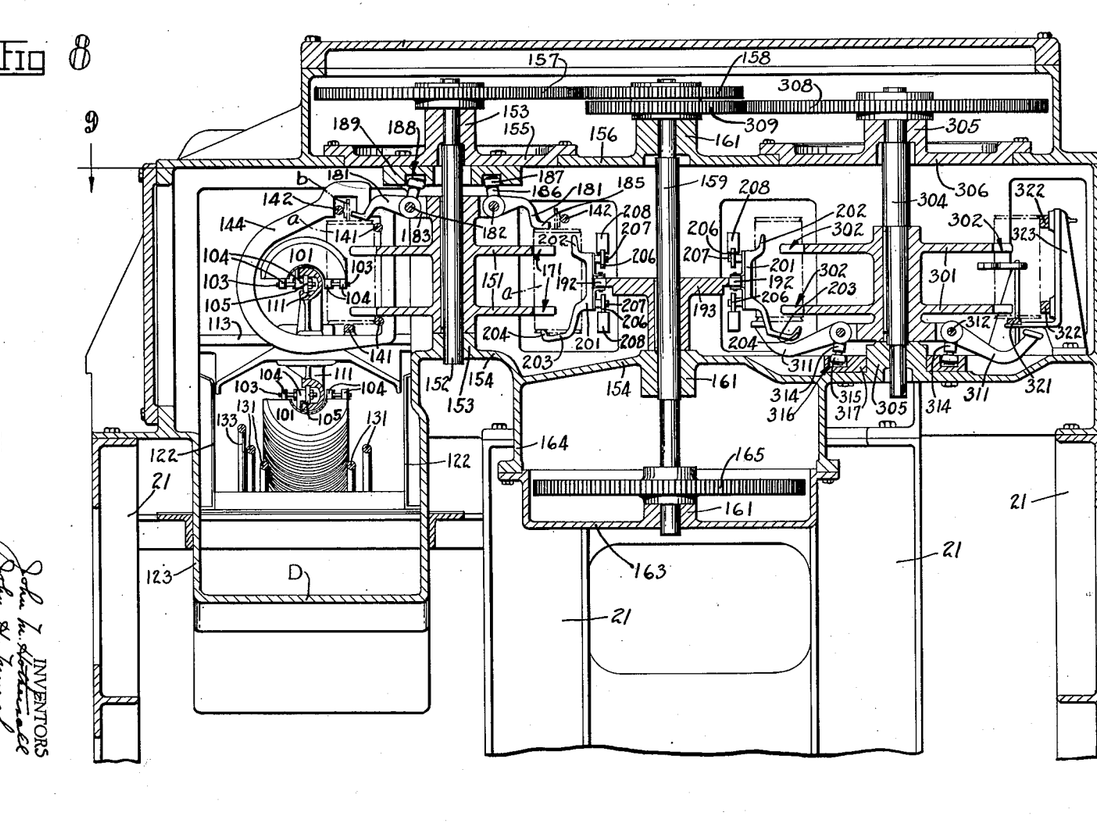
Figure 9:
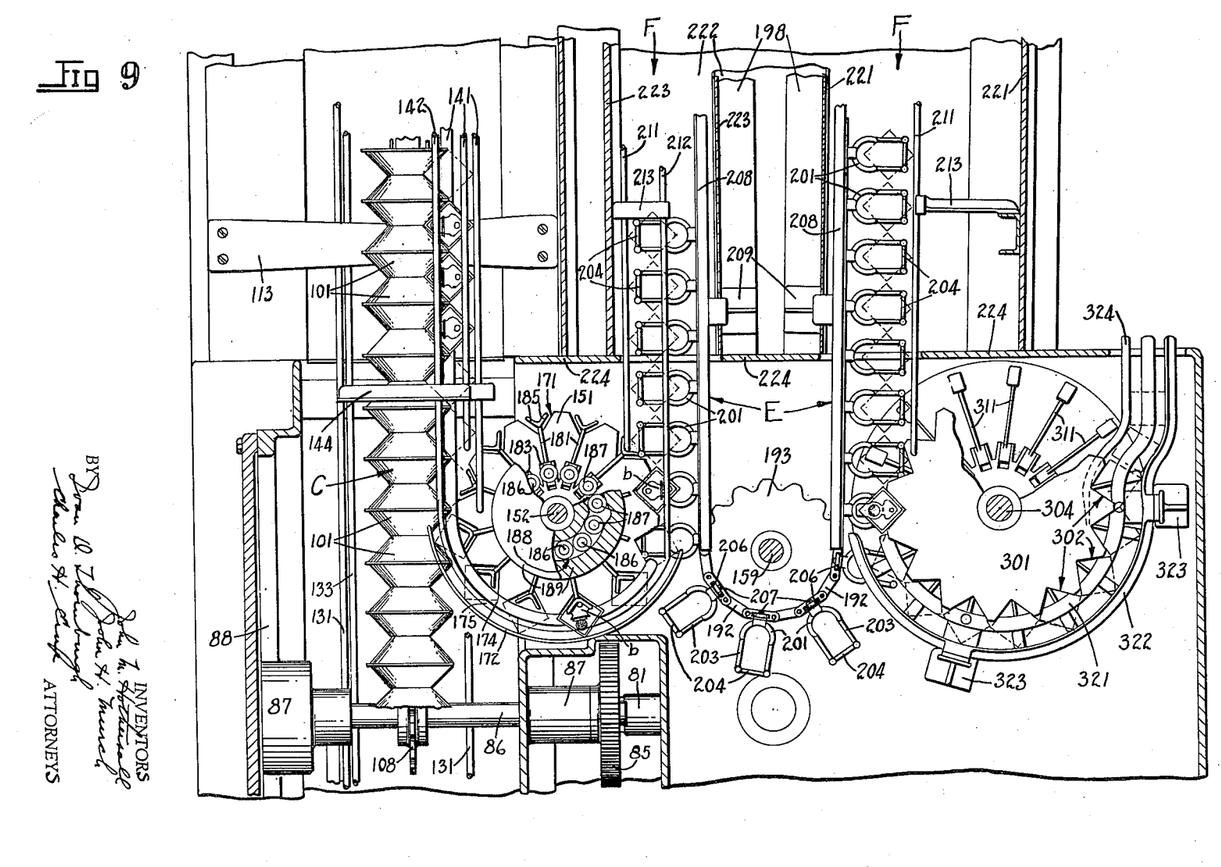
Fig. 9 is a horizontal section taken substantially along the line 9—9 in Fig. 8.

The righted and coated containers are carried back toward the container entrance end of the machine where they are discharged from the conveyor C by a transfer device which is best illustrated in Figs. 8 and 9. This transfer device includes a rotatable turret 151 which is mounted on a vertical shaft 152 journaled in bearings 153 formed in a lower web section 154 of the main frame and in a cover plate 155 which is secured over an opening in an upper web section 156.

At its upper end the shaft carries a spur gear 157 which meshes with a gear 158 mounted on the upper end of a vertical drive shaft 159. The drive shaft is journaled in bearings 161 formed in the web sections 154, 156 and in a lower cover 163 secured to a depending portion 164 of the web section 154. At its lower end the drive shaft carries a gear 165 which meshes with and is driven by a pinion 166 (see Fig. 6) carried on the continuously rotating vertical shaft 68. It is this shaft 68 that drives the turret 151.

The transfer turret 151 is provided with spaced V-shaped pockets 171 which come into alignment with containers in the buckets 101 of conveyor C and which receive such containers from the conveyor. A curved guide plate 172 disposed adjacent the periphery of the transfer turret retains the containers in their pockets as the turret rotates. The bottom guide bar 141 and also the closure holding guide bar 142 extend beyond the other guide bars and are coextensive with the guide plate 172. Accordingly while in the turret 151 the containers ride over and are supported on a curved extension section 174 of the bottom guide bar 141, and the closure elements b are held open by passing along the concentric curved section 175 constituting an extension of the guide bar 142.

The containers are also held against upward displacement during this movement with the transfer turret. For this purpose there is provided a plurality of horizontal fingers 181 one being disposed over the top of each pocket 171. These fingers are mounted on pivot pins 182 carried in lugs 183 and each finger is formed with two angularly disposed prongs 185 which are adapted to bear down and rest on the top of the containers. The inner end of each finger extends up into an upright arm 186. Each arm carries a cam roller 187 which operates in a cam groove 188 of a stationary cam 189 secured to the cover plate 155 of the machine frame.

Thus as the transfer turret rotates, the rollers 187 riding around in the cam groove 188 rock their respective fingers 181 on their pivots and move the prong 185 of a finger down into engagement with the top of a container just as the container enters the turret pocket. The rotating transfer turret conveys the containers to the chilling conveyor E but seating of the container into proper position therein will be more fully explained hereinafter.

The chilling conveyor E is parallel with the adjacent run of the coating conveyor C (Fig. 9) but is separated therefrom, being disposed in large part in the chilling chamber F (Fig. 2) which is located adjacent to and parallel with the paraffin tank D. This chilling conveyor E includes an endless chain 192 (Figs. 8 and 9) which takes over horizontal and spaced sprockets 193, 194 (see also Figs. 10 and 11).

Sprocket 193 is the driving sprocket and is mounted on the continuously rotating vertical shaft 159. Sprocket 194 is located at the opposite end of the machine and is mounted on an idler shaft 195 journaled in bearings 196 formed in brackets 197 secured to a horizontal structural iron sub-frame 198 supported on the longitudinal main beams 22 of the machine frame.

At spaced intervals along its length, the conveyor chain 192 is provided with container cages 201 having upper and lower spaced and spreading prongs 202, 203 adapted to fit a received container and hold it against displacement in a vertical cater-corner or oblique position. The lower prongs 203 are further provided with upright short end lugs 204 which locate the received container and provide a seat on which the container rests. The container when first received from the transfer turret 151 is pushed down into this seat by the cam operated finger 181 hereinbefore mentioned.

In their passage between the conveyor sprockets 193, 194, the container cages 201 are maintained in a horizontal plane by upper and lower rollers 206 which are mounted on pins 207 secured at the rear of the cages. These rollers operate in spaced guide tracks 208 the upper roller passing below the upper track, the lower roller riding on the upper surface of the lower track. The two tracks 208 are secured to brackets 209 mounted on the horizontal sub-frame 198.

Guide rails 211 (Figs. 2, 9 and 11) disposed parallel with the conveyor chain 192 retain the moving containers in their cages while another guide rail 212 maintains the closure element b of each container in open position. These guide rails are secured in brackets 213 which are supported on the main machine frame.

Figure 2:
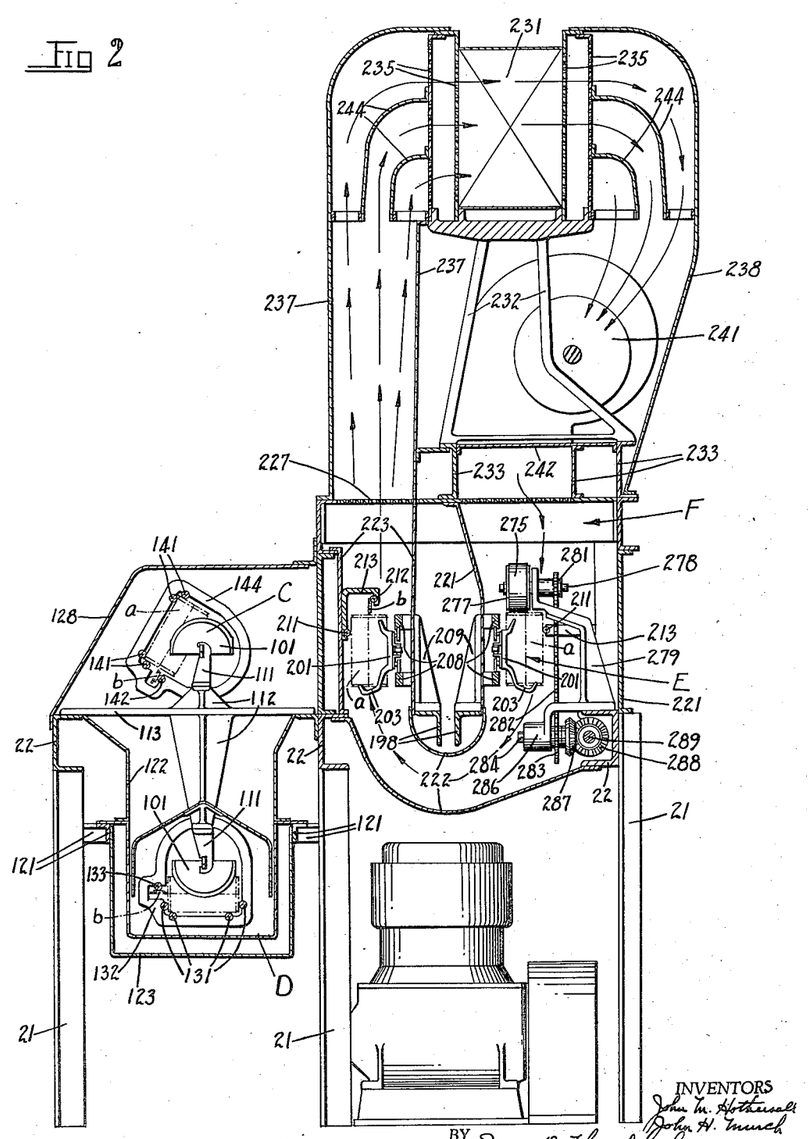
Fig. 2 is an enlarged vertical transverse section taken substantially along the broken line 2—2 in Fig. 1.
Figure 11:
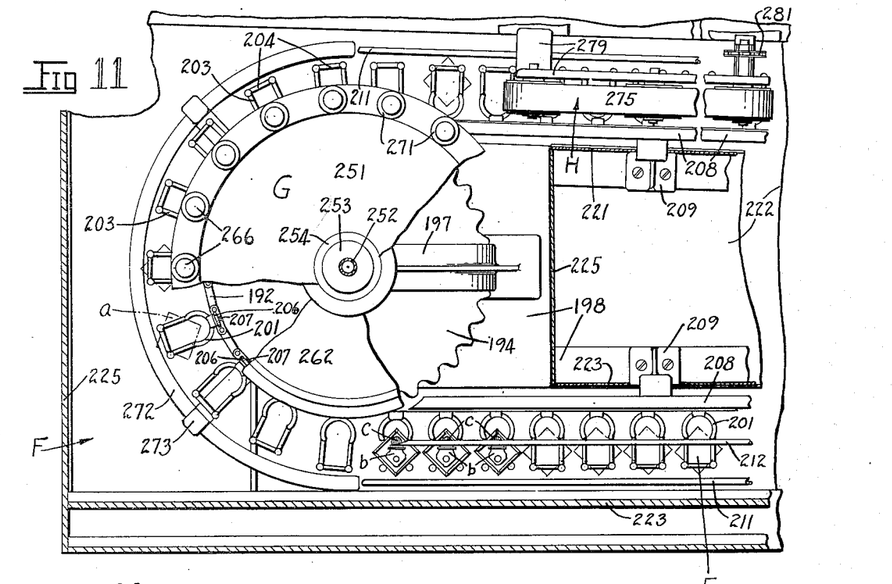
Fig. 11 is a plan view partially in section of the parts shown in Fig. 10.

A container placed into one of the cages 201 is carried into and through the chilling chamber F and partial cooling and setting of the paraffin coating takes place at that time. This chamber is enclosed by a housing which includes vertical outer side plates 221 (Fig. 2) which are adjacent the outer run of the conveyor, curved bottom connecting plates 222, vertical inner side plates 223 which are adjacent the inner run of the conveyor and end plates 224 (Fig. 9) and 225 (Fig. 11). These plates arranged as described set off a U-shaped channel which constitutes the chamber F and which is covered over with a perforated cover plate 227 (Fig. 2).

Air which is filtered and substantially sterile and chilled is circulated through this U-shaped chamber so that it will impinge against the containers carried by the conveyor E. For this purpose there is provided a cooling coil and suitable air filters housed in a casing 231 (Fig. 2) mounted on brackets 232 bolted to beams 233 secured on top of the perforated cover plate 227. The sides of the cooling and filter casing 231 are provided with perforated plates 235 through which air may pass. One side of the casing is connected by plates 237 to the chamber housing plates 223 and thus form continuations of these latter plates so that the walls of chamber F continue upwardly and join with the cooling and filter casing and inclose the circulating channels.

In a similar manner the opposite side of the cooling and filter casing is connected by an outer plate 238 to the outer plate 221 of the chamber housing. This sets off an enlarged portion of the circulation channel which connects with the chamber F. In this enlarged portion of the channel there is located a blower 241 which may be operated in suitable manner as for example by an electric motor or other driving instrumentality. The blower rests on a perforated plate 242 which is secured to the beams 233 of the frame.

Inside the channel there is also disposed adjacent the sides of the cooling and filter casing 231, auxiliary channel plates 244 which break up the circulating air as it enters and leaves the cooling and filter unit. Thus air within the channels of chamber F is circulated and recirculated by the blower 241 which also forces the air through the cooling and filtering unit in a continuous stream. This maintains the inside of the chamber in a substantially sterile condition and at a predetermined chilling temperature.

As the containers in the cages 201 of the chilling conveyor E move through this atmosphere of cool, filtered air the paraffin coating begins to set but does not harden immediately. While the paraffin is still plastic, other cool, filtered and substantially sterile air is introduced directly into the interior of the containers. This takes place as they pass around the sprocket 194 located at the far end of the machine.

Charging of the containers with the filtered air is effected by the charging device G which includes a hollow cylindrical housing 251 (Figs. 10 and 11) secured to the sprocket shaft 195 and rotating therewith. The interior of the housing is in communication with an inlet pipe 252 which conveys the air from a suitable source of filtered and substantially sterile air supply. The machine end of this pipe passes through a stuffing box 253 provided in a centrally located boss 254 formed in the top of the housing.

Adjacent its periphery the housing is formed with a skirt portion which contains a plurality of spaced air charging heads 256. Each head is provided with a vertical filling tube 257. Each tube is secured in a slide block 258 which slides in a slot 259 formed in the head. The inner end of the block carries a cam roller 261 which rides on a stationary cam 262 secured to the upper bearing 196 of the sprocket shaft 195.

The ends of the filling tubes 257 are open. The upper end of each tube extends into the interior of its charging head 256 and is directly under a valve 265 of a valve unit 266 secured in the head. There is one of these valves for each charging head. Each valve is backed up by a compression spring 267 which normally holds the valve down below the valve unit.

During part of the rotation of a charging head, this being while the head is moving around that part of the sprocket not engaged by the conveyor E, the cam 262 holds the filling tube up so that its upper end engages and raises the spring pressed valve forming a seal between tube and valve. This prevents escape of air from the housing 251. As a charging head comes into position over the top of a container which is then starting its travel around the sprocket 194, the cam 262 permits the filling tube to move down and its lower end moves into the container by passing into the filling opening c.

This lowering of the filling tube shifts its upper end away from its valve 265 and opens the interior of the tube thereby permitting air from the housing to pass into and charge the container. This filling continues throughout the container travel around the sprocket 194 and provides sufficient time for the cool filtered air to entirely replace the hot air originally in the container. During this travel around the sprocket the closure element b of the container is maintained in an open position by an annular projection 271 which is formed on the filling tube. The containers while moving around the sprocket are also held in place in the conveyor cages 201 by a curved guide rail 272 which is supported by brackets 273 secured to the sub-frame 198.

At the end of the filling cycle the cam 262 lifts the filling tube 257 out of the container filling opening c and closes its upper end by again engaging the valve. At this point in the travel of the container through the chilling chamber its paraffin coating is almost set but before final setting, the closure element b of the air charged container is closed. This takes place as soon as the container has rounded the sprocket 194 and begins its return travel along the outer run of the conveyor. In leaving the tube projection 271 the closure element of a container at this position is left unsupported.

Closing of the closure elements b is effected by an endless belt 275 (Figs. 10 and 11) which is disposed directly over the path of travel of the containers. The lower run of the belt engages the tops of the containers and as each container passes thereunder its closure element is pressed down into its filling opening c and is sealed in place by the paraffin which fully sets before leaving the belt. The filtered and substantially sterile air is thus trapped within the container.

The closing belt 275 operates over a plurality of spaced pulleys 277 which are supported on short shafts 278 carried in a bearing bracket 279 secured to the outer main beam 22 of the machine frame. One of these shafts serves as a driving shaft to operate the belt in time with the travel of the containers in the conveyor E. This driving shaft carries a sprocket 281 (see also Fig. 2) which is rotated by an endless chain 282 taking over a drive sprocket 283 mounted on a shaft 284. Shaft 284 is journaled in a bearing 286 of the bearing bracket 279.

The outer end of the shaft 284 carries a bevel gear 287 which meshes with a bevel gear 288 mounted on a shaft 289 (see also Fig. 7) which extends nearly the full length of the machine and is journaled in bearings 291 spaced at intervals along the machine frame. Adjacent the feed-in end of the machine the shaft 289 carries a bevel gear 293 (Fig. 6) which meshes with a bevel pinion 294 mounted on a cross shaft 295 journaled in bearings 296 of the frame cover plate 74. The inner end of the shaft 295 carries a bevel gear 297 which meshes with a bevel gear 298 mounted on the continuously rotating vertical shaft 68. It is this shaft and the gear train immediately above described that drives the container closing belt 275.

The closed container with its paraffin coating fully set and hard continues its travel back to the feed-in end of the machine where it is discharged to any suitable place of deposit. Discharge of the containers is effected by a rotatable double disc turret 301 (Figs. 8 and 9) having V-shaped pockets 302 which are adapted to receive the containers from the conveyor cages 201. The turret is mounted on a vertical shaft 304 which is journaled in bearings 305 formed in the frame web section 154 and in a cover plate 306 over an opening in the frame web section 156.

The discharge turret is rotated by a spur gear 308 carried on the upper end of the vertical shaft 304. This gear meshes with a gear 309 which is mounted on the vertical shaft 159 adjacent the gear 158.

As each pocket 302 of the discharge turret 301 comes into alignment with a container on the conveyor E, the container is lifted vertically out of its seat in its conveyor cage 201. This is done by a cam actuated radial finger 311 which is disposed beneath each pocket of and is carried around with the turret. Each finger is mounted on a pivot pin 312 carried in lugs 313 formed on the turret. Each finger is also provided with a depending arm 314 on which a cam roller 315 is mounted and this rocks the finger on its pivot. All of the cam rollers carried around with the turret move in a cam groove 316 of a stationary cam 317 surrounding the lower bearing 305 of the turret shaft.

When a container is being lifted in its conveyor cage 201 it is already in its turret pocket 302 and as it reaches its raised position it is moved over a curved bottom rail 321 which thereafter supports it. Outer curved guide rails 322 which begin at this point transfer the container from conveyor E and hold it in the turret pocket 302.

These rails are secured to brackets 323 which are supported on the machine main frame. After approximately one half revolution of the discharge turret the containers are swept out of their pockets by a guide bar 324 and this latter guide bar cooperating with the outer guide rails 322 directs the discharged containers to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for preparing empty sealed moisture proof sterile containers for the subsequent packaging of milk and the like, wherein means are provided in the machine for interiorly and exteriorly coating with waxlike material preformed fibre containers having a filling and dispensing opening in a wall thereof and a hingedly secured closure element for removably closing said opening, said machine also having means for cooling, means for sterilizing and means for closing the coated containers and means for continuously conveying the containers through the machine during the described coating and treating operations, the combination of a closed housing surrounding the conveying means, said conveying means consisting of a plurality of adjacent endless coating and treating conveyors disposed in substantially parallel relation within separate juxtaposed communicating chambers within said housing respectively containing said coating and treating means out of contact with the atmosphere, guide rails disposed adjacent the path of travel of said conveyor for supporting and guiding the containers while being advanced thereon, said guide rails maintaining the containers in a horizontal position during their passage through said batch and thereafter to invert the coated containers for draining and then to turn the drained containers into upright position above the bath, said guide rails including means for holding the hinged closures of said containers in open position during the movement of the containers through said bath to insure admission of molten wax to the interior of said containers, and means disposed between adjacent ends of said coating and treating conveyors for successively receiving the upright coated containers from the coating conveyor and for transferring such containers to said treating conveyor for the cooling, sterilizing and closing operations.

2. In a machine for preparing empty sealed moisture proof sterile containers for the subsequent packaging of milk and the like, wherein means are provided in the machine for interiorly and exteriorly coating with waxlike material preformed fibre containers having a filling and dispensing opening in a wall thereof and a hingedly secured closure element for removably closing said opening, said machine also having means for chilling, means for sterilizing and means for closing the coated containers and means for continuously conveying the containers through the machine during the described coating and treating operations, the combination of a closed housing surrounding the conveying means, said conveying means consisting of a plurality of adjacent endless coating and treating conveyors disposed in substantially parallel relation within separate juxtaposed communicating coating and chilling chambers within said housing and respectively containing said coating and treating means out of contact with the atmosphere, means for actuating said coating conveyor to successively advance the open containers while lying on their sides through and beneath the surface of a bath of molten wax, means disposed between adjacent ends of said coating and treating conveyors for successively receiving the wax coated containers in upright position from the coating conveyor and for transferring such containers to said treating conveyor, and means for circulating a chilling medium through said chilling chamber for quickly setting the wax coating on the containers as the latter are conveyed therethrough.

3. In a machine for preparing empty sealed moisture proof sterile containers for the subsequent packaging of milk and the like, wherein means are provided in the machine for interiorly and exteriorly coating with waxlike material preformed fibre containers having a filling and dispensing opening in a wall thereof and a hingedly secured closure element for removably closing said opening, said machine also having means for chilling, means for sterilizing and means for closing the coated containers and means for continuously conveying the containers through the machine during the described coating and treating operations, the combination of a closed housing surrounding the conveying means, said conveying means consisting of a plurality of adjacent endless coating and treating conveyors disposed in substantially parallel relation within separate juxtaposed communicating coating and chilling chambers within said housing and respectively containing said coating and treating means out of contact with the atmosphere, means for actuating said coating conveyor to successively advance the containers with their closure elements in open position through and beneath the surface of a bath of molten wax to coat the exterior and interior surfaces of the containers, means disposed between adjacent ends of said coating and treating conveyors for successively receiving the wax coated containers from the coating conveyor and for transferring such containers to said treating conveyor, and means in said chilling chamber for charging sterile air directly into said open coated containers while the same are advanced and chilled in said chamber, whereby to prevent contamination of the interior surfaces of the treated and coated containers prior to filling the same.

4. In a machine for preparing empty sealed moisture proof sterile containers for the subsequent packaging of milk and the like, wherein means are provided in the machine for interiorly and exteriorly coating with waxlike material preformed fibre containers having a filling and dispensing opening in a wall thereof and a hingedly secured closure element for removably closing said opening, said machine also having means for chilling, means for sterilizing and means for closing the coated containers and means for continuously conveying the containers through the machine during the described coating and treating operations, the combination of a closed housing surrounding the conveying means, said conveying means consisting of a plurality of adjacent endless coating and treating conveyors disposed in substantially parallel relation within separate juxtaposed communicating coating and chilling chambers within said housing and respectively containing said coating and treating means out of contact with the atmosphere, means for actuating said coating conveyor to successively advance the open containers while lying on their sides through and beneath the surface of a bath of molten wax, means disposed between adjacent ends of said coating and treating conveyors for successively receiving the wax coated containers in upright position from the coating conveyor and for transferring such containers to said treating conveyor, means for circulating a chilling medium through said chilling chamber for partially setting the wax coating on the containers as the latter are conveyed therethrough by said treating conveyor, means in said chilling chamber for charging filtered sterile air into said coated containers while the same are advanced and cooled in said chamber, and means located in said chilling chamber for sealing the closure elements on the openings of said air filled containers prior to complete cooling and setting of the wax coating while the containers are advanced through said chamber, whereby to prevent contamination of the interior surfaces of the treated and coated containers prior to filling the same.

5. In a machine for preparing empty sealed moisture proof sterile containers for the subsequent packaging of milk and the like, wherein means are provided in the machine for interiorly and exteriorly coating with waxlike material preformed fibre containers having a filling and dispensing opening in a wall thereof and a hingedly secured closure element for removably closing said opening, said machine also having means for chilling, means for sterilizing and means for closing the coated containers and means for continuously conveying the containers through the machine during the described coating and treating operations, the combination of a closed housing surrounding the conveying means, said conveying means consisting of a plurality of adjacent endless coating and treating conveyors disposed in substantially parallel relation within separate juxtaposed communicating coating and chilling chambers within said housing respectively containing said coating and treating means out of contact with the atmosphere, means for actuating said coating conveyor to successively advance the containers with their closure elements in open position through and beneath the surface of a bath of molten wax, means disposed between adjacent ends of said coating and treating conveyors for successively receiving the wax coated containers in upright position from the coating conveyor and for transferring such containers to said treating conveyor, means for circulating a chilling medium through said chilling chamber for partially setting the wax coating on the containers as the latter are conveyed therethrough by said treating conveyor, means in said chilling chamber insertable into and removable from the container openings for charging filtered sterile air into said coated containers while the same are advanced and cooled in said chamber, and means located in said chilling chamber for sealing the closure elements in the openings of said air filled containers while the same are advanced through the chamber, whereby to prevent contamination of the interior surfaces of the treated and coated containers prior to filling the same.

6. In a machine for preparing empty sealed moisture proof sterile fibre containers for the subsequent packaging of milk, said containers having a filling opening and a hingedly secured closure element for sealing said opening, said machine having a coating section with coating means therein and a section containing means for cooling, sterilizing and closing the coated containers, and conveyor means for continuously advancing the containers through the machine, the improvement comprising arranging the container coating and treating means adjacent the conveying means, said conveying means consisting of a plurality of endless conveyors disposed in contiguous relation within separate adjacent communicating coating and treating chambers enclosed and protected from the atmosphere by a single closed housing, means disposed within said housing between adjacent ends of said conveyors for receiving the coated containers from the coating conveyor and for transferring such containers to said treating conveyor, means for circulating a cooling medium through said treating chamber to partially cool and set the wax coating on said containers, means disposed adjacent said treating conveyor for injecting sterile air directly into the filling openings of the containers while the closure elements thereof are in open position, and means disposed in said treating chamber in the path of movement of said containers for engaging and sealing down by means of the partially cooled wax said closure elements to trap and confine the sterile air within the containers, whereby to prevent contamination of the interior surfaces of the coated containers and to reenforce the same against inward collapse prior to filling the containers.

7. In a machine for preparing empty sealed moisture proof sterile fibre containers for the subsequent packaging of milk, said containers having a filling opening and a hingedly secured closure element for sealing said opening, said machine having a coating section and a section for cooling, sterilizing and closing the coated containers, and conveyor means for continuously advancing the containers through the machine, the improvement comprising arranging the container coating and treating devices adjacent the conveyor means, said conveying means consisting of a plurality of endless conveyors disposed in substantially parallel relation within separate adjacent communicating coating and treating chambers enclosed and protected from the atmosphere by a single closed housing, a rotary turret having peripheral pockets disposed within said housing between adjacent ends of said conveyors for receiving the coated containers from the coating conveyor and for transferring such containers to said treating conveyor, a blower for circulating a cooling atmosphere through said treating chamber to partially cool and set the wax coating on said containers, a vertically reciprocable pipe disposed adjacent said treating conveyor and having means for projecting the same into and withdrawing said pipe from the container openings for injecting sterile air directly into the containers while the closure elements thereof are in open position, and an endless belt member disposed in said treating chamber in vertical relation to the path of movement of said containers on said treating conveyor for engaging and sealing down by means of the partially cooled wax said hinged container closure elements to trap and confine the sterile air within the containers, whereby to prevent contamination of the interior surfaces of the coated containers and to reenforce the same against inward collapse as a result of the cooling treatment and prior to filling the containers with milk.

8. In a machine for preparing empty sealed moistureproof sterile containers for the subsequent packaging of milk and the like, wherein means are provided for interiorly and exteriorly coating with waxlike material preformed fibre containers having a filling and dispensing opening in a wall thereof and a closure element for removably closing said opening, the machine also having means for cooling, means for sterilizing and means for closing the coated containers, and means for continuously conveying the containers through the machine during the described coating and treating operations, the improvement comprising a closed housing, a coating chamber within said housing, a treating chamber also within the housing, said chambers being in communication adjacent one end of said housing, said conveying means consisting of an endless conveyor located in said coating chamber for advancing containers through a coating operation and an endless conveyor located in said treating chamber for advancing coated containers for further treatment in said treating chamber, and a transfer device located between said coating and treating conveyors and within the communicating ends of said coating and treating chambers for transferring coated containers from said coating conveyor into said treating conveyor.

9. In a machine for preparing empty sealed moistureproof sterile containers for the subsequent packaging of milk and the like, wherein means are provided for interiorly and exteriorly coating with wax-like material preformed fibre containers, having a filling and dispensing opening in a wall thereof and a hingedly secured closure element for removably closing said opening, the machine also having means for cooling, means for sterilizing and means for closing the coated containers, and means for continuously conveying the containers through the machine during the described coating and treating operations, the combination of a closed housing, a coating chamber within said housing, a treating chamber also within the housing and extending substantially parallel to said coating chamber, said chambers being in communication adjacent one end of said housing, said conveying means consisting of a plurality of endless conveyors disposed in adjacent parallel relation and located in said chambers for advancing the containers through the chambers, means in said coating chamber for coating the containers as they move through the chamber, cooling, sterilizing and container-closing means in said treating chamber for so treating the containers while passing through the treating chamber, and transfer devices for removing containers from each of said conveyors following each container treatment.

10. In a machine for preparing empty sealed moistureproof sterile containers for the subsequent packaging of milk and the like, wherein means are provided for coating with wax-like material preformed fibre containers having a filling and dispensing opening in a wall thereof and a hingedly secured closure element for removably closing said opening, the machine also having means for chilling, means for sterilizing and means for closing the coated containers, and means for continuously conveying the containers through the machine during the described coating and treating operations, the combination of a closed housing, a coating chamber within said housing, a bath of molten wax within said coating chamber, said conveying means including an endless coating conveyor operated within said coating chamber for passing the containers through said bath to fill the containers with molten wax, means adjacent the path of travel of coated containers passing from said bath to invert and drain the containers, a treating chamber within said housing adjacent to and communicating at one end with said coating chamber, said conveying means further including an endless treating conveyor operating within said treating chamber for passing coated containers through the treating chamber, a transfer device for receiving containers from said coating conveyor and for transferring the same to said treating conveyor, and means located in said treating chamber for chilling, means for sterilizing and means for closing the coated containers.

11. In a machine for preparing empty sealed moistureproof sterile fibre containers for the subsequent packaging of milk and the like, said containers each having a filling and dispensing opening in a wall thereof and a hingedly secured closure element for removably closing said opening, the combination of a plurality of endless conveyors disposed in adjacent parallel relation, a closed housing surrounding said conveyors, means in said housing to form communicating coating and treating chambers therein, means in the coating chamber for interiorly and exteriorly coating the containers, means within said housing and cooperating with said coating conveyor for tilting the containers in opposite directions in the plane of their longitudinal axes transversely of their path of travel on the conveyor for draining the surplus wax from the containers and for shifting the drained containers into upright vertical position, and a rotary transfer turret within said housing and having peripheral pockets therein disposed between adjacent ends of said coating and treating conveyors for successively receiving the upright coated containers from the coating conveyor and for transferring such containers to said treating conveyor, for the treating operation in said treating chamber.

JOHN M. HOTHERSALL.
JOHN H. MURCH.